United States Patent [19]

Burton

[11] 4,290,422
[45] Sep. 22, 1981

[54] SURGICAL HEADLIGHT SYSTEM

[76] Inventor: Charles V. Burton, 18409 Minnetonka Blvd., Deephaven, Minn. 55391

[21] Appl. No.: 54,825

[22] Filed: Jul. 5, 1979

[51] Int. Cl.³ .............................................. A61B 1/06
[52] U.S. Cl. ..................................................... 128/23
[58] Field of Search ............................ 128/23, 21, 22; 362/804, 420, 421

[56] References Cited

U.S. PATENT DOCUMENTS

| | | | |
|---|---|---|---|
| 1,538,191 | 5/1925 | Lando | 128/22 |
| 2,353,537 | 7/1944 | Arnesen | 128/23 |
| 2,517,422 | 8/1950 | Gellman | 128/22 |
| 2,893,379 | 7/1959 | Springer | 128/23 |
| 3,645,254 | 2/1972 | Burton | 128/23 |
| 3,745,993 | 7/1973 | Feimbloom | 128/23 |
| 3,830,230 | 8/1974 | Chester | 128/23 |
| 3,951,139 | 4/1976 | Kloots | 128/23 |
| 4,102,333 | 7/1978 | Storz | 128/22 X |

FOREIGN PATENT DOCUMENTS 615537  7/1937  Fed. Rep. of Germany ........ 128/22

Primary Examiner—John D. Yasko
Attorney, Agent, or Firm—Merchant, Gould, Smith, Edeli, Welter & Schmidt

[57] ABSTRACT

An improved surgical headlight that includes a headband for supporting the light on the head of the wearer. The headband carries an appropriate support for frictionally engaging a ball joint member which is carried by and above a light projecting element so that the wearer can manually manipulate the light projecting element to cause the ball joint member to be rotated in the support and frictionally held in a selected position until such time as the light projecting element is manipulated into a different position. These improved surgical headlight systems preferably include means for adjusting the vertical relationship between the ball joint member and the light projecting element so that the wearer may raise or lower the light projecting means to assist in the alignment of the axis of the light projector with the visual axes of the wearer's eyes.

2 Claims, 7 Drawing Figures

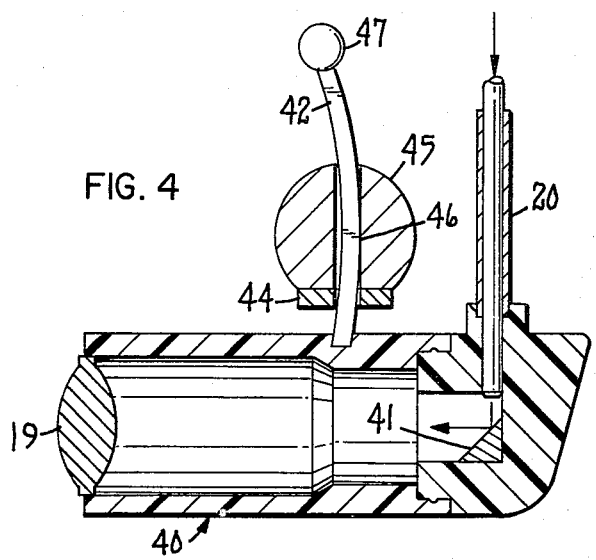
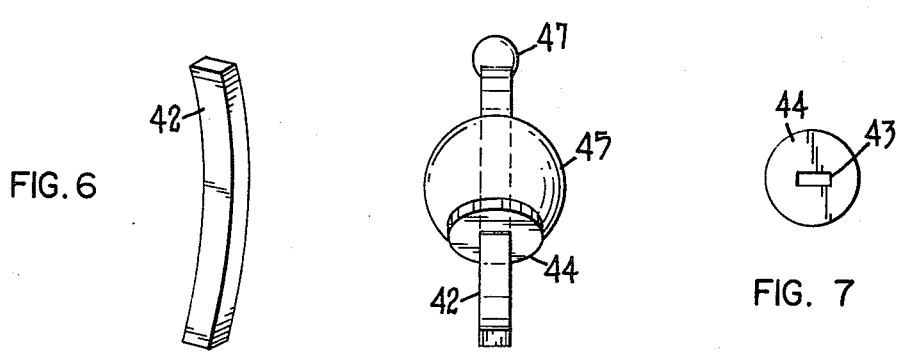

SURGICAL HEADLIGHT SYSTEM

FIELD OF THE INVENTION

The present invention relates to the field of surgical or medical lights of the type intended to be worn on the head of the user, and in particular to lights of this general type which are suited for use by surgeons in the operating room.

BACKGROUND OF THE INVENTION

Surgical headlights present a number of design problems which are not normally present in the design and construction of headlights used for other purposes (e.g. underground mining). For example, surgical headlights must be useable in the presence of volatile and often flammable or explosive materials such as alcohol and anesthesia gases. Further, such headlights should be designed and constructed to permit easy cleaning and sterilization.

With the advent of fiber optics, a number of improvements in surgical headlights have been made possible. For example, U.S. Pat. No. 3,645,254 described a surgical headlight in which fiber optics are used to transmit light rays from the light source to the light projecting element. The surgical headlight described in that patent includes a frictionally engaged ball joint carried by and at the rear of the light projecting element. This ball joint is held by a pair of opposed support arms carried by and at the front of a suitable headband. In a preferred form, the fiber optic cable passes through an aperture in the ball joint that is coaxial with the light projecting element. The surgical headlight shown in U.S. Pat. No. 3,645,254 is, in a sense, "universal" in that the wearer can freely adjust the direction of the light projecting element by simple movement of the light projector.

A different style of surgical headlight is shown in U.S. Pat. No. 3,745,993. The surgical headlight shown in that patent is supported from a headband by a pair of metal, spaced-apart vertical arms which are attached to the light projecting element by screws. These two screws act as pivot points on which the light projecting element may swivel in a vertical direction or arc, only. Thus, the surgical headlight shown in U.S. Pat. No. 3,745,993 is not "universal" in the sense of U.S. Pat. No. 3,645,254. Rather, the surgical headlight of U.S. Pat. No. 3,745,993 is intended to be "coaxial" with the visual axes of the wearer's eyes.

Although both of the surgical headlights shown in U.S. Pat. No. 3,645,254 and U.S. Pat. No. 3,745,993 have been manufactured and sold in the U.S.A. and are in widespread use, each of these two types of surgical headlights has certain disadvantages. For example, the light projecting element in the surgical headlight system shown in U.S. Pat. No. 3,645,254 protrudes a substantial distance from the wearer's forehead during use. If several surgeons are working on the same patient, their respective headlights sometimes interfere with each other. Further, the form of the headlight shown in the drawings of U.S. Pat. No. 3,645,254 is not "coaxial" with the visual axes of the wearer's eyes. In a somewhat similar fashion, the surgical headlight system of U.S. Pat. No. 3,745,993 is not a "universal" surgical headlight but rather it is free to move only in a vertical arc. This is a problem if the headband is not perfectly centered before use or if it is moved on the wearer's head during use. Further, neither of the surgical headlight systems shown in these two patents includes any means for adjusting the distance between its respective light projecting element and the support arms. Such adjustments are essential if the headlight is to be truly "coaxial" for wearer's of different facial configurations (e.g. high foreheads, low foreheads, etc.).

SUMMARY OF THE INVENTION

The present invention is an improved surgical headlight system which is both "universal" and "coaxial". In a preferred embodiment, the improved surgical headlight systems of the present invention include means for adjusting the vertical distance between the light projecting element of the headlight and the support arms for the light projecting element, thereby permitting the wearer to adjust the vertical position of the light so as to compensate for the physical differences between different wearers thereby making the headlight more truly coaxial with the visual axes of the wearer's eyes.

Breifly described, the improved surgical headlights of the present invention include a headband for supporting the light on the head of the wearer. The headband carries an appropriate support for frictionally engaging a ball joint member. A light projecting element is then carried by and below the ball joint member so that the wearer can manually manipulate the light projecting element thereby causing the ball joint member to be rotated in the support and frictionally held in a selected position until such time as the light projecting element is manipulated into a different position. Optionally and desirably these improved surgical headlight systems will further include means for adjusting the vertical relationship between the ball joint member and the light projecting element so that the wearer may raise or lower the light projecting means to assist in the alignment of the axis of the light projector with the visual axes of the wearer's eyes.

Although the improved surgical headlights of the present invention can be powered by batteries or other sources of electrical energy, they are preferably illuminated by using a fiber optic light cable to transmit light from a remote source to the light projecting element with the fiber optic cable preferably entering the light projecting element at an angle of about 90 degrees relative to the central axis of the light projecting element.

DESCRIPTION OF THE DRAWINGS

FIG. 4 is a fragmentary cross-sectional side view of the surgical headlight system illustrating a simple frictional lock for raising and lowering the light projecting element.

FIG. 5 is a fragmentary perspective view of the ball joint member of FIG. 4.

FIG. 6 is a perspective view of the frictional adjusting rod shown in FIG. 5.

FIG. 7 is a bottom plan view of the lock ring shown in FIG. 5.

DETAILED DESCRIPTION

The present invention can be understood by reference to the several drawings.

Figure 2:
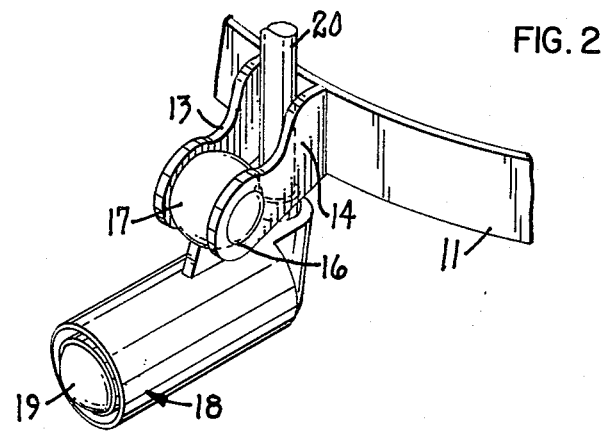
FIG. 2 is a fragmentary perspective view of the surgical headlight system shown in FIG. 1.
Figure 1:
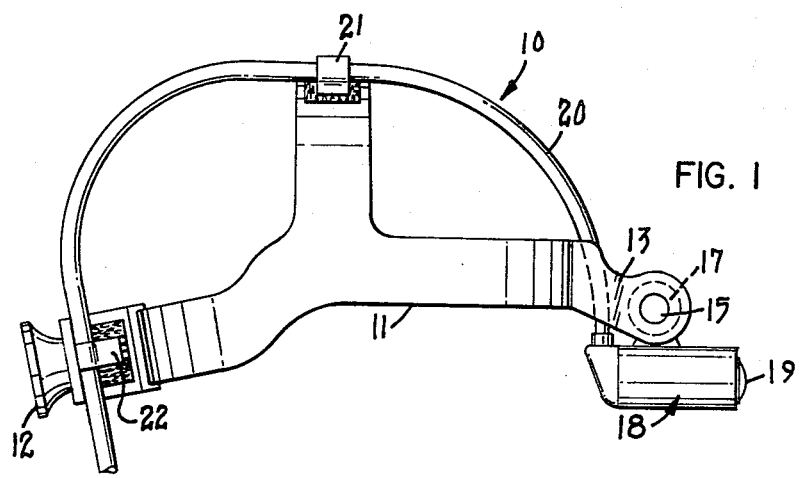
FIG. 1 is a side elevational view of one embodiment of the improved surgical headlight system.

The overall surgical headlight system is shown in FIG. 1 and is generally designated by the numeral 10. As shown in this Figure, the surgical headlight system 10 includes a headband 11 for supporting the headlight on the head of the wearer. A knob 12 is positioned at the rear of the headband which may be rotated by the wearer to increase or decrease the effective size of the headband to adjust the headband to the size of the head of the wearer. The selection of a suitable mechanism for adjusting the headband is within the skill of the art and one such mechanism for adjustment is shown in U.S. Pat. No. 3,645,254. At the front of the headband 11 are two support arms 13 and 14 (support arm 14 is more readily seen in FIG. 2). Support arms 13 and 14, which are preferably made of plastic e.g. nylon), are each provided with suitable apertures 15 and 16 (aperture 16 can be seen in FIG. 2) which allow the two support arms 13 and 14 to embrace and hold by friction ball joint member 17. Carried by and below ball joint member 17 is a light projecting element generally designated by the numeral 18. Light projecting means or element 18 includes a projecting lens 19. Light projecting element 18 is connected to a fiber optic cable 20 that is conveniently attached to headband 11 with Velcro fasteners 21 and 22 which permit easy detachment of the cable from headband 11.

When fiber optics are used to provide light for projection from light projecting element 18, fiber optic cable 20 will be used and will be connected to a remote light source (not shown). However, light projecting element 18 can be powered directly by some electrical source such as batteries contained within the element. Fiber optics are preferred.

Figure 3:
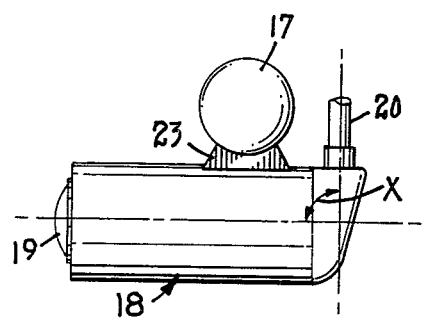
FIG. 3 is a fragmentary side elevational view of the surgical headlight system of FIG. 1 showing the ball joint member, light projecting element and a portion of the fiber optic cable.

The connection between fiber optic cable 20 and light projecting element 18 can be made by adhesive bonding, by a snap mechanical fit, or by a simple friction fit. The relationship between the ball joint member 17 and the light projecting element 18 can be further understood by reference to FIGS. 2 and 3 in which like numerals indicate like components. For convenience, the ball joint member 17 can be connected to the light transmitting element 18 by means of a simple bridge or flange 23 which may be adhesively bonded in place or formed as a unit with the main housing for the light containing element 18 and the ball joint 17 (e.g. as by injection molding).

FIGS. 4-7 illustrate a desirable feature of the preferred improved surgical headlights of the present invention. This feature is a means for permitting the wearer of the headlight to vertically adjust the distance between the ball joint member 45 and the light projecting element 40.

As shown in FIG. 4, the light projecting element is generally designated by the numeral 40. The light projecting element 40 is connected to a fiber optic cable 20. The fiber optic cable 20 is attached to the light projecting element 40 at approximately 90 degrees relative to the central axis of the light projecting means (see angle "X" of FIG. 3). As a result, a mirror 41 is positioned within light projecting element 40 to reflect the light being transmitted through fiber optic cable 20 out through projection lens 19. If desired, suitable filters and additional lenses (not shown) may be used to alter the color or focus of the projected light. Attached to light projecting element 40 is a slightly curved rod 42 of generally rectangular cross section. This curved rod 42 extends upwardly and passes through a generally rectangular opening or aperture 43 in lock ring 44 which is bonded to ball joint member 45. The curved adjusting rod 42 further extends through a small diameter hole or aperture 46 that extends through ball joint member 45. Because of the slight curve in adjusting rod 42, the frictional fit between adjusting rod 42 and the interior walls of opening 46 is sufficiently strong as to secure the light projecting element 40 to the ball joint member 45 and yet it is sufficiently moveable as to permit adjusting rod 42 to be moved upwardly or downwardly within hole 46 by the wearer to thereby decrease or increase the distance between the ball joint member 45 and the light projecting element 40. A small knob 47 is secured to the upper end of adjusting rod 42 (e.g. adhesively or threadably) to prevent the adjusting rod 42 from being unintentionally withdrawn from ball joint member 45 and also to facilitate comfortable adjustment of the headlight when the adjusting rod 42 must be pushed downwardly through ball joint 45 by the wearer.

USE OF THE IMPROVED SURGICAL HEADLIGHT

For purposes of the following description, it will be assumed that the present improved surgical headlight will be used in conjunction with a fiber optic cable as shown in FIG. 1, utilizing, however the vertical adjustment feature as shown in FIGS. 4-7.

If the cable and combination ball joint member/light projecting element have been removed from the headband 11, it will be necessary to first reattach light projecting element 40 the headband 11 by forcing the ball joint member 45 between the pair of support arms 13 and 14. Because of the resiliency associated with many modern plastics, the ball joint member 45 can easily be snapped into place with the fingers. Next, the fiber optic cable 20 is laid over headband 11 and secured to the headband with the aid of Velcro straps 21 and 22. The headband adjustment knob 12 is then rotated sufficiently to permit the headband to be placed on and around the head of the wearer with the support arms 13 and 14 generally centered on the wearer's forehead with the light projecting element 40 extending down and generally between or slightly above the wearer's eyes as may be comfortable to the wearer. Headband adjusting knob 12 is then rotated in the appropriate direction to cause the headband 11 to contract and be confortably secured to the wearer's head. After the light source (not shown) is turned on, the wearer will grasp the light projecting element 40 and cause the light to be aimed at the desired point of impact on the patient or on some reference object. Final adjustment of the light is made by causing adjusting rod 42 to frictionally slide within the opening 46 of ball joint member 45 and by rotating or tilting the light projecting element 40. In this manner, the improved surgical headlight system of the present invention becomes both universal and coaxial with the visual axes of the wearer's eyes.

The use of a friction lock or similar finger manipulated adjustment (e.g. a threaded plastic shaft) for vertical alignment of the light projecting element 40 permits such adjustments to be mae by the wearer without removing the headband 11 from the wearer's head. This is not possible with conventional set screws which are ordinarily manipulated with hand tools (which is impractical under normal surgical conditions).

Having described the present invention with a certain degree of particularity, it will be realized that various modifications and substitutions can be made to the present headlight without departing from the spirit and scope of this invention.

I claim:

1. A surgical headlight system comprising:
   (a) a headband for supporting the light on the head of the wearer, said headband being adaptable for positioning on the head of the wearer above the level of the eyes;
   (b) support means carried by said headband for frictionally engaging a ball joint member;
   (c) a ball joint member frictionally engaged with said support means;
   (d) elongated light projecting means having an axis of elongation spaced from said ball joint member, said projecting means carried by and below said ball joint member and disposed for easy movement in all directions in a continuum of positions wherein light is emitted from said projecting means along the axis of elongation and generally away from said headband, wherein the light projecting means is connected to a fiber optic light cable which transmits light from a light source to said light projecting means, said fiber optic light cable entering said light projecting means at an angle of about 90° relative to the central axis of the light projecting means; and
   (e) adjusting means, connecting said ball joint member to said light projecting means, for varying the distance between said ball joint member and said light projecting means so that said axis of elongation can be positioned proximate the axes of vision of the wearer's eyes;
   (f) wherein said adjusting means comprises a shaft carried by said light projecting means and extending in frictional engagement through an aperture in said ball joint member whereby moving said shaft through said aperture will cause the light projecting means to be raised or lowered.

2. Surgical headlight systems of claim 1, wherein said aperture has greater cross-sectional dimensions than does said shaft and wherein said shaft is bowed to accomplish said frictional engagement.

* * * * *